United States Patent [19]

Malecki

[11] 4,104,410

[45] Aug. 1, 1978

[54] PROCESSING OF GREEN VEGETABLES FOR COLOR RETENTION IN CANNING

[76] Inventor: George J. Malecki, 157 Weston Rd., Wellesley, Mass. 02181

[21] Appl. No.: 721,878

[22] Filed: Sep. 9, 1976

Related U.S. Application Data

[63] Continuation-in-part of Ser. No. 427,242, Dec. 21, 1973, abandoned.

[51] Int. Cl.² ............................................. A23B 7/00
[52] U.S. Cl. ................................. 426/399; 426/401; 426/412
[58] Field of Search ............... 426/262, 263, 270, 402, 426/401, 412, 405, 407, 615, 629, 634, 639, 240, 511, 521, 509, 397, 399

[56] References Cited

U.S. PATENT DOCUMENTS

| | | | |
|---|---|---|---|
| 1,685,511 | 9/1928 | Thomas | 426/509 |
| 2,529,514 | 11/1950 | Roberts | 426/402 |
| 2,718,470 | 9/1955 | Kaufman | 426/402 |
| 2,976,157 | 3/1961 | Malecki | 426/270 |
| 3,873,753 | 3/1975 | Nelson et al. | 426/521 |

OTHER PUBLICATIONS

Bitting, Appertizing or The Art of Canning, Its History and Development, The Trade Pressroom, San Francisco, Calif., (1937), p. 572.

*Primary Examiner*—Raymond N. Jones
*Assistant Examiner*—C. A. Fan
*Attorney, Agent, or Firm*—Kenway & Jenney

[57] ABSTRACT

A process for treating peas or other green vegetables such that they may be canned in a manner to retain their green color. The process is characterized by the steps of maintaining the vegetable in a fresh state and in an aerobic environment such that it does not wilt and continues to respire aerobically up to the sterilization step, sterilizing the vegetable at a temperature between 250° F, preferably 275° F, and the scorching temperature of the vegetable for a sufficient amount of time to yield a commercially sterile vegetable, and sealing the vegetable in a container. The conventional blanching step is eliminated in this process but may be replaced by a hot water wash at a temperature below the thermal injury temperature of the vegetable. The process produces green color retained vegetables without the addition of dyes or chemicals (except for salt and sugar) to the can.

7 Claims, No Drawings

PROCESSING OF GREEN VEGETABLES FOR COLOR RETENTION IN CANNING

SUMMARY, OBJECTS, AND BACKGROUND OF THE INVENTION

This application is a continuation-in-part of application Ser. No. 427,242, filed Dec. 21, 1973, now abandoned.

This invention relates to a canning method for green color retention in canned vegetables such as spinach, garden peas, asparagus, green beans, lima beans, brussel sprouts, kale, and avocadoes, without the employment of any chemicals or other additives, and while maintaining a vegetable flavor equal or superior to conventionally canned vegetables.

The first step of the method consists of maintaining the vegetable in an aerobic environment and at a temperature below its thermal injury temperature up to the time of sterilization, whereby the vegetable enters the sterilization step fresh, i.e., living, respiring, and substantially in the same state of freshness as when it were harvested.

This means that the blanching operation, as conventionally used in vegetable canning operations must be eliminated. It is preferable to replace the conventional blanching operation by a washing step at a temperature below that which is injurious to vegetable cells (i.e., 120°–140° F for most vegetables). The temperature of thermal injury should be determined experimentally for each vegetable in cases where the selected washing temperature is close to the upper limit.

Next, the vegetable is sterilized in a short time, high temperature process. The sterilizing temperature should preferably be as high as possible, e.g., 250° F at least, and preferably 275° F or higher, up to the scorching temperature for a given vegetable, e.g., 375°–425° F. The time of the sterilizing step should be as short as possible, but must be of sufficient length such that *Clostridium botulinum* spores are killed as required by the FDA and the U.S.A. National Canners Association sterilization test. The time of sterilization, accordingly, ranges from a fraction of a minute or a few seconds at high temperatures to 5 minutes at 260° 270° F. The time and temperature of sterilization have an inverse relationship, and the important aspect of the sterilization is that it be as short as possible. Accordingly, higher temperatures require less time, and thus color retention is enhanced to greater degrees as the temperature of sterilization is raised. While best results are achieved at temperatures above 275° F, the effect of the process of the invention is noticable between 250° and 275° F.

It is also preferable to slit or puncture vegetables, especially those which are skin coated such as peas, in order to facilitate the release of occluded gases from inside the vegetable tissue.

Two metabolical processes can take place in vegetables. First, a vegetable can undergo aerobic respiration, an exothermic process, wherein the vegetable absorbs oxygen from the air, burns internal sugar, starches, etc., and produces energy and carbon dioxide which is respired into the atmosphere. Secondly, a vegetable can undergo photosynthesis, an endothermic process wherein the vegetable utilizes light to synthesize chlorophyll, starch, cellulose, and other building blocks constructed mainly from carbon dioxide absorbed through the leaves.

Normally, after the vegetable is excised from the plant, photosynthesis diminishes and the plant undergoes aerobic respiration as long as adequate supplies of air are available. This accounts, for example, for the rapid loss of taste which takes place in corn immediately after picking. However, if the supply of air is inadequate for a given vegetable, the vegetable begins to undergo an anaerobic respiration wherein, for a limited time, it produces energy by exothermically decomposing sugars, starches, or other available energy source molecules to form alcohols, ketones, esters, and sometimes organic acids. If these products of anaerobic respiration are allowed to accumulate within the vegetable, they eventually "kill" the vegetable tissue. In any event, such accumulation is chacterized by insipient and objectionable off-flavors.

In conventional operations, if some off-flavor is formed during anaerobic respiration, which, for example, may occur in the carts in which vegetables are placed awaiting processing, then, during the high temperature of the conventional blanching step, most if not all off-flavor compounds (primarly volatile substances) are eliminated by evaporation. Further, anaerobic respiration is terminated by the conventional blanching step because the enzymes responsible for this type of respiration are inactivated at the temperature of the blanch.

It has now been discovered that vegetables, after excision, start to respire intensely. With respect to peas, respiration rate increases still further when they are removed from the shell, and the rate is still further accelerated when they are injured as by contact with shelling machine paddles, etc. Accordingly, the period of time between harvest and canning of peas and the availability of air in areas surrounding the peas should ideally be adjusted so that the time is short as possible and air is available for normal respiration. When the blanching step is eliminated, if off-flavors are to be avoided in the canned product, then the vegetable must be provided with air to ensure that anaerobic respiration will not take place. This is accomplished by storing the vegetable between harvest and processing in containers which will allow a flow of air about the vegetable. While forced air may be used for this purpose, excess exposure may cause excessive sugar consumption. Accordingly, it is preferred to simply pile the peas or other vegetable in bins having walls made of fine screen or the like.

Green peas are the preferred vegetable to be treated by the process of the invention, and in the specification, peas are indicated as the main vegetable processed. However, it should be noted that peas are indicated only by way of example and that the processing of other vegetables or food compositions such as spinach, green beans, asparagus, peas and onions, peas and red pepper, pea soup, baby food purees, mixed vegetables, and stews is contemplated.

Prior art processes for the retention of green color in canned green vegetables all required some additive in order to achieve the color retention, i.e., to prevent the conversion of chlorophyll into yellow-olive colored pheophytin. These additives can be classified into two principal groups: (1) alkalizing or alkalizing-buffering agents such as $Mg(OH)_2$, $Ca(OH)_2$, NaOH, KOH, $Na_2CO_3$, $NaHCO_3$, $Na_2HPO_4$, $Na_3PO_4$, di-sodium glutamate, Na-sucrate, and similar compounds of K, Ca, and Mg; and (2) metallic salts and complexes (coordination compounds) such as $CuSO_4$, $CuCl_2$, Cu chlorophyllide, Cu salt of the ethylene-di-aminotetra-acetic acid, and similar salts and complexes of Fe, Zn, Al, or Mg.

With the second group, most of these metals are toxic and are not allowed in most countries as food additives. With the first group the pH and the intensity of the retained green color decreases gradually while the canned green vegetable is kept in storage at room temperature so that to achieve a satisfactory green color retention at the end of one year of storage, it is often necessary to maintain the pH at a level such that an ammoniacal flavor (barn-yard flavor) develops. For example, the ammonia flavor is probably produced by the hydrolysis of amides (like glutamine or aspargine) which are present in pea tissue. There is also another kind of off-flavor at high pH which develops from the hydrolysis and increasing rancidity of minute amounts of fat (lipids) present in pea tissue. Specifically, it is believed that fats easily hydrolyze at a pH above 8.5 and at the high sterilization temperature during the sterilization process, while it is known that products of fat hydrolysis are easily oxidized and thus may become rancid. Can contents always contain at least traces of oxygen which can react to create rancidity and off flavors.

A principal object of the present invention is to provide green color retained vegetables which are free of any additive or chemical intended for the green color retention.

A further object is to design a process for canning green vegetables with green color retention without the addition of any additive or chemical intended for the color retention comprising processing the vegetable using only one heating step (e.g., a sterilization), wherein the temperature is higher than the thermal injury temperature, whereby the vegetable is fresh, not wilted, and has living and respiring noninjured tissue, i.e., is essentially in a similar state as directly after harvesting or picking, up to the time of canning.

A further object is to provide a process of canning green vegetables with green color retention comprising all conventional processing steps except for the blanching step whereby peas prior to the sterilization are essentially in the same state of freshness as they were directly after harvesting or picking, i.e., not wilted and respiring.

A further object is to replace the conventional blanching step with a washing step utilizing plain water or water with added pea juice or crushed peas (in amount, for instance, ¼ - 25% per weight of the pea juice or crushed pea-water mixture) in adequate amounts to produce a satisfactory cleaning action, at a temperature above freezing but below the thermal injury temperature, for instance, usually within the temperature range from 30°-32° F up to 120°-125° F.

A further object of the invention is to produce green color retained canned peas without brine.

Still another object of the invention is to provide a process for canning green vegetables which retains nutrients and natural flavors.

These and other objects and features of the invention will be apparent to those skilled in the art from the following description of some preferred embodiments.

DESCRIPTION OF THE PREFERRED EMBODIMENT

At the outset, the invention will be described in its broadest overall aspects with a more detailed description following.

The present invention relates to a method of canning green vegetables with green color retention in which a good color storage stability is obtained without any additive or chemical mixed with the vegetable for this purpose. The invention is based on the discovery that if a green vegetable is not blanched, and prior to sterilization, is not otherwise heat processed to cause wilting or other damage to the freshness of the vegetable, then after canning, the green color retention (chlorophyll retention) is significantly better than when conventional canning is carried out (including a blanching (scalding) step). Furthermore, if the sterilization step is carried out in a rotary agitated cooker or in a stationary retort at a temperature between 250° and 275° F for from 10 minutes to 1 minute, respectively, or better at between 275° and 325° F for a fraction of a minute, or still better between between 325° F up to scorching temperature for a given vegetable or food composition (e.g., for peas 375°–400° F or even 425° F) for about a few seconds, then the green color is satisfactorily retained with storage stability adequate for commercial purposes.

Blanching, as a process step conducted prior to sterilization, is so well entrenched in the canning industry that its elimination is quite revolutionary and its effects quite surprising. Blanching serves the dual function of thoroughly washing the vegetable and, in appropriate cases, wilting it so that it can be packed in sufficient quantities in containers. While the blanching step is eliminated in the instant process, washing and wilting may still be effected, where necessary.

At room temperature (65°-75° F), the vegetables produced by this process have a green color stability of 6-36 months. The higher the temperature of sterilization and the shorter the corresponding sterilization time, the better is the brightness of the green color and the longer is the storage time until the green vegetable loses its retained green coloration and becomes yellowish or olive. In each case, the sterilization time should be adequate to kill *Clostridium botulinum* spores and to inactive tissue enzymes.

In order to optimize flavor of the canned product in the absence of the conventional blanching treatment, the time between harvesting and sealing should be reduced as much as possible. More specifically, while post excision aerobic respiration is normal and is not overy detrimental to freshness, anaerobic respiration rapidly leads to the production of off-flavors, and is to be avoided. Especially in embodiments of the process wherein the sterilization step is effected in the can, it is desirable to maintain the peas or other green vegetables in an environment such that sufficient oxygen is available to inhibit the onset of anaerobic respiration. In this regard, it is contemplated that vegetables should be temporarily stored in bins or other containers which allow free circulation of air through and about the vegetables.

The invention discovered that the high temperature of the conventional blanching (scalding) step causes major damage to the green color retention and its storage stability. More surprisingly, it has been discovered that temperatures as low as 135°-150° F cause damage to the chlorophyll in the vegetable tissue, although the green color of the vegetable after such low temperature exposure becomes much brighter and more intense than that of the fresh, unblanched vegetable (peas for instance). At the same time, the vegetable tissue wilts, thereby demonstrating that damaged vegetable tissue is present after such heating. This tissue and chlorophyll damaging temperature is usually at about 125°–150° F. However, its exact value depends on the kind of vegetable and on growing conditions as well as on vining and processing conditions. Accordingly, if it is desired to heat the vegetables prior to sterilization to as high a temperature as possible, then the temperature of thermal injury (T.T.I.) should be determined in each case. In some cases, it may happen that the T.T.I. will be higher than 130° F. Usually, it is not necessary to determine T.T.I. since most vegetables can be washed at the temperature within the range of 100° to 120° F or lower.

The determination of T.T.I. may be done simply by putting peas into cold water, heating, and observing the color of the peas. If the color is compared with peas which are not heated (another sample of peas which have been boiled may be also used for comparison to see in what direction the color should change), then it is easily observed that at a certain temperature the color of the peas will start to brighten and intensify. This shows the beginning of damage to pea tissue, i.e., this temperature will be the T.T.I.

Similarly, the T.T.I. can be determined by watching the turgicity of pea tissue, e.g., by measuring the force necessary to pierce a pea with a needle using a penetrometer of suitable construction. The temperature at which the penetrometer will show a significant rise of the softness (i.e., decrease of the penetration force) is the approximate T.T.I.

A more exact method of T.T.I. determination is to prepare 12 vessels with thermostatically controlled water at 90, 95, 100, 105, 110, 115, 120, 125, 130, 135, 140, 145, and 150° F, place fresh peas into the vessels for the time intended for the washing operation (see later for the washing operation description), and determine the color reading by means of a recording or indicating colorimeter (e.g., as manufactured by Munsell or Gardner Co.) as well as determining the turgicity by means of a penetrometer. The amount of water used in each vessel should be adequate so that when peas are put into the water, the temperature of the water should not change by more than 1°–2° F. Also, the respiration rates of so treated peas should be determined since respiration rate is the most sensitive indication of a damage to the tissue of peas. Furthermore, the treated pea sample from each vessel should be boiled in water for the same predetermined time (e.g., 5–10 minutes) and the conversion rate of the chlorophyll to pheophytin should be determined (for instance spectroscopically or spectrophotometrically by the method of McKinney and West). These determinations should be repeated for peas treated at each temperature and results analyzed graphically. Breaking points on the curves for each of the determined characteristics vs. temperature will show temperature points at which each characteristic begins to be affected by heat. All thus determined points will fall within a range of temperatures and the lowest temperatures in this range should be taken as the T.T.I. for a given variety and batch of peas or other vegetable tested. For very exact work, the point of the beginning of the chlorophyll conversion characteristics is the most relevant for pea canning conditions.

The surprising fact that the intense, bright green color of blanched peas is associated with a higher vulnerability of the color to heating than the paler green color of fresh peas is believed to be explainable as follows. The chloroplasts contain the chlorophyll in association with protein and lipids. It is possible that the protein in this chlorophyll-protein-lipid complex forms a protective envelope around the chlorophyll molecule (or unit). During the heat blanching, the protein is denatured and possible coagulates as many proteins do (pea proteins belong to a class of heat vulnerable proteins). The coagulation may cause the envelope around the chlorophyll to shrink and expose the chlorophyll leaving it unprotected and vulnerable to heat and acid pH-induced conversion to pheophytin.

After a vegetable has been subjected to its T.T.I., the conversion of chlorophyll into the pheophytin proceeds on cooking under atm. pressure at 212° F, initially (first 1–5 minutes) at the rate of 4–8% per minute. The conversion rate increases with higher temperatures. With increased temperature of sterilization, the time required to kill *Clostridium botulinum* and inactive enzymes decreases much more than proportionally to increases in temperature. For this reason, the chlorophyll conversion rate decreases with decreased sterilization time (heating time) much more than proportionally to the temperature increase.

Furthermore, it has been discovered that agitation during the sterilization step significantly improved the green color retention and its storage stability, while at the same temperature and time of sterilization but without agitation (at stationary conditions) the green color brightness and storage stability were much lower.

The following points are essential or recommended (as indicated) when practicing the invention described herein:

(a) It is highly preferable to maintain the peas in an aerobic environment for any time interval between harvesting and processing to inhibit anaerobic respiration.

(b) It is essential not to heat the peas above the temperature of thermal injury prior to the sterilization step.

(c) It is essential to sterilize the peas or pea-containing food within the temperature range from at lowest 250° F (and preferably at least 275° F) up to the scorching temperature at sterilization conditions (particularly at the pressure and for an adequate time to achieve permanent inactivation of enzymes and to kill spores of *Clostridium botulinum* as required by Food Authorities and the National Canners Association). This time is usually not more than 5 minutes at 260°–270° F and not less than a fraction of a second (for liquid foods) or a few seconds (for particulate foods) at the upper limit close to scorching temperature (usually not higher than 425° F). The higher sterilization temperature and the shorter the sterilization time, the brighter is the green color and the longer is its storage stability under commercial conditions.

(d) It is preferable to have the peas or the brine in forced motion against the heat transfer surface or medium (e.g., steam). This means that either the peas are moving and heat transfer surface is not in motion (as in a scraped film heat exchanger), or the heating medium is in motion and peas are not in motion (as in heating and sterilizing with direct live steam), or both are in motion, (as in agitated rotary cooker, where the cans roll on a spiral inside of a steam filled tubular cooker so that both the peas and the heat transfer surface are in motion).

(e) It is preferable to sterilize the peas and other foods with direct saturated steam at the pressure corresponding to the desired temperature of sterilization, rather than heating through a wall (or a can or a heat exchanger).

(f) It is preferable to replace the blanching operation with a washing step either in plain water or water containing pea juice or disintegrated peas or vines. The purpose is to clean peas from juice and dirt acquired during the mechanical vining operation, shelling, etc.

The optimal temperature at which the washing is most efficient should be chosen considering the following: High washing temperatures (over 100° F) are more efficient than lower temperatures in that occluded gases are more easily removed and dirt and dried juices soften up and easily wash away. On the other hand, low temperatures (33°-60° F) suppress bacteria growth as well as the metabolic functions of the pea tissue (such as respiration which eats up sugars in the tissue). Thus, low washing temperatures slow down the deterioration of pea quality which usually takes place during the processing operations. The usual temperature for the washing operation is 90°-110° F.

(g) It is preferable to slit, puncture, or otherwise intentionally damage the skins of peas. The purpose of this is to facilitate the removal of occluded gases from the pea tissue whereby the formation of swells from released gases in a closed can may be greatly suppressed.

(h) The aseptic canning method is preferred for following reasons:

A. Turgid and elastic vegetables such as spinach and string beans are softened and shrunk by blanching (scalding) to enable the vegetables to be packed in adequate amounts into cans. This is an important function of blanching in conventional processing, and turgid vegetables cannot be packed into cans without blanching (prior to sterilization). Garden peas, lima beans, and asparagus can be packed into cans in a fresh state, and during sterilization, shrinking and softening will take place causing some moderate underfill. However, this may not be objectionable if the consumer is forewarned in advance about the underfill.

With asceptic canning, the vegetable is sterilized before it is filled into cans whereby the elimination of blanching has no bearing on the fill of the container, which is satisfactory with or without blanching. Also, any occluded gases are removed during the high temperature action in the sterilization step so that slitting or puncturing is not always recommended.

B. The higher sterilization temperature, shorter time, and stronger agitation than is present in the conventional canning processes makes the green color retention better (brighter color and better storage stability) in the aseptic canning method. At the same time, the flavor is better because of the shorter heating time.

The invention will be further understood from the following examples, which in no event should be construed as limiting.

EXAMPLE 1

Product: Canned green color retained garden peas in brine

Garden peas are conventionally vined, washed in a drum washer with cold water at 40°-70° F, punctured or slit (as described by J. C. Moyer et al. in N.Y. Agricultural Experimental Station in Geneva, New York, Journal Paper No. 1078), gravity separated in a common salt solution (e.g. 10-20% by weight of NaCl in water), passed through a conventional drum blancher (with pea residence time therein of 3-6 minutes) and filled with plain water at 40°-100° F. The washing water is separated from the peas at the end of the washing operation and returned to the drum blancher-washer. To prevent the accumulation of microorganisms in washing water it is recommended to keep the water at a low temperature of 40°-50° F. Alternatively, when washing at higher temperatures than 50° F the washing water should be changed every 1-3 hours either by continuously discarding an appropriate part of the returning water (e.g. 30-50%) or by providing two washers and alternating their use so that in one washer the water is being discarded, refilled and heated up to 80°-100° F, and in another washer the washing operation is taking place. To assist in washing, especially at temperatures below 80° F, disintegrated peas (3-6% by weight) or pea juice pressed out of waste vines or peas (2-4% by weight) can be added to the washing water. Usually, it is not necessary to add these pea-derived washing aids, since the amount of broken-up peas and empty shells resulting from rough handling during the vining operation is adequate for this purpose. The word "blancher" for the drum washer is used only in order to describe this equipment easily and of course, no "blanching" is actually performed, but only washing at below T.T.I.

After washing, the peas, mixed with brine, are sterilized in a scraped film heat exchanger (e.g., Trademark "Votator" of Chemetron Corporation) with slow rotation, e.g., 15-60 r.p.m. of the shaft, and with an increased diameter (e.g., 1 inch inside diameter) of the tubes connecting the sterilizing heat exchanger with the cooling one, next in series, where the peas are partially cooled. The complete cooling is accomplished in another heat exchanger next in series. Afterwards, the cool peas (at about room temperature or somewhat higher e.g., at 100° F) pass through leak-proof tubes into the sterile filler where they are filled together with brine (if desired) into pre-sterilized cans, glass jars, or other sealable containers.

The resulting product (from Perfection variety of peas) had a brighter green color which was still distinctly green after 12 months at 65°-70° F. The flavor was excellent. There was no trace of alkaline, ammoniacal-off-flavor.

In the above described asceptic canning processing, the sterilization was accomplished at 292° F for about 18 seconds at least (as required by the killing of *Clostridium botulinum* spores and permanent inactivation of tissue enzymes).

Proceeding in the same way but adding onions or red pepper or carrots, the following new products could be produced: pea with onions, pea with red pepper, or pea and carrot respectively whereby the peas would have a bright green color. Furthermore, by simply pouring off brine prior to filling, peas without brine can be produced, whereby more nutritious peas are made available without loss of water soluble proteins and vitamins. In this regard, the housewife typically discards the brine before or after cooking the peas. Also, by mashing peas and processing as above described, either soup or baby food puree could be obtained with the attractive natural green color of peas. Mixed vegetable soup or stew (with meat) could be similarly produced in which peas would be naturally green.

EXAMPLE 2

Product: Chopped spinach with retained green color

Spinach is harvested, washed in cold water at 40°-70° F in tanks, then dewatered by centrifuging, and chopped with sharp knives so that it is not necessary to mash the cells of spinach tissue. The chopped spinach mass is fed into the scraped film heat exchanger at 275° F for 60 seconds, or at 350° F for a much shorter time (a few seconds). The sterilized spinach mass is cooled in two successive scraped film heat exchangers and filled into presterilized cans or glass jars or film pouches (made from heat resistant polyester film, e.g., "Mylar", a trademark of 3M Company). The product consisted of bright green colored spinach with excellent flavor, which retained green color after 12 months storage at 65°-75° F.

EXAMPLE 3

Product: Cut green string beans

String beans are harvested, washed in room temperature water, cut into pieces 1½ - 2 inches long then washed at 40°-100° F in a drum washer similarly as to the peas in example 1. Afterwards, a suitably concentrated brine is added containing extra salt so that, after dilution with water or condensed steam from the sterilizing step, a conventional brine results. Thereafter, the beans are sterilized with live steam at 325° F for 5 seconds and filled into presterilized cans using, for instance, the equipment described by C. O. Ball in his U.S. Pat. No. 2,303,422 or in the many patents of William McKinley Martin. The resulting product was bright green beans with an excellent flavor and a stable green color for over 12 months at room temperature. Instead of aseptic canning sterilization, string beans can be advantageously packed together with conventional salt-sugar brines directly after washing and other conventional processing steps into non-sterile cans, closed under a vacuum of 15 inches and sterilized and cooled in the rotary agitated cooker (e.g., "Sterilmatic" trademark of the Food Machinery Corporation) at 270°-290° F for an adequate time for achieving the commercial sterility.

It should be noted that in examples 1 and 2 it is advantageous to place a holding tank between the cooler and the filler.

In all the described examples the sterilization separately of the food product and the can (if metallic) may be performed by radioactive irradiation with pasteurization as described in the literature. When using irradiation and aseptic canning, it may be more convenient to sterilize metallic cans with super-heated steam, as is done at the present time. Also, the food product may also be "canned" by being packed into a radiation-transparent container (e.g., plastic cartons) so that the sterilization can be advantageously performed while the food product is packed into the container. The sterilization can be performed by a combination of irradiation with pasteurization.

It should be noted that wherever green color is retained as described in this specification it is being done by means of a process which calls for no additives or chemicals intended for green color retention. However, additives and chemicals intended for the improvement of flavor (such as monosodium gluatamate, spices, salt, and saccharine, antioxidants tocopherols, and butylated hydroxyanisole), texture (such as $CaCl_2$, polyphosphates of sodium salts in excess for skin tenderization of peas), nutritive qualities (such as vitamins, trace elements special sugars, and dietetic supplements), and any other additive or chemical not active in green color retention are not included in the term "additive or chemical".

The terms "canning" "canned" mentioned throughout the specification, refer to the vegetable product or process describing the commercially sterile vegetable or food product packed in a hermetically closed containers (metal cans, bottles, plastic containers, or plastic pouches), whereby sterile conditions are maintained within the container.

SUMMARY OF ADVANTAGES OF THE INVENTION

A principal advantage of the invention is believed to reside in the fact that green color stabilized peas and other green vegetables may be produced by the process of the invention without the necessity of adding foreign non food substances to the can.

Another advantage is that the flavor and texture of peas canned by the method described herein is not altered radically as compared to the same peas treated by conventional techniques including a blanching step. Furthermore, peas processed in accordance with the invention are at least as close in flavor if not closer, to fresh peas than are conventionally processed peas. This is a significant commercial advantage since the prior art color stabilized peas have a distinctly different flavor from either fresh peas or conventionally canned peas.

Peas processed as described herein retain their freshness, natural firmness, and high resistance to impact until sterilization. Accordingly, the number of splits and empty shells is significantly reduced as compared to conventionally canned peas in which the blanching step softens and renders the peas amenable to injury on impact.

Another important advantage of the process of the invention is that canned green color retained peas can be produced in combination with other nonacid foods, which cannot be canned at an alkaline pH. Thus, the following examples of foods can be produced incorporating green color retained peas: stews, mixed nonacid vegetables, peas and onion, peas and garlic, peas and red pepper, creamed peas (with milk), peas and carrots, vegetable soups, and gelatine gels with peas.

During blanching, proteins and other water soluble constituents of nutritional importance become dissolved in blanching water. This fact may account for proteins being reduced by 10-14% of their total amount during conventional processing. Also, vitamins of the B and C groups are dissolved, and this loss is up to 25% of their total amount.

The off flavor developed in alkalized green color retained peas cannot develop in the method described herein because the pH of the peas is normal (about 6.5-6.7) and the heating period is short.

The excessive softening which sometimes occurred in alkalized peas due to excessive concentration of sodium ions cannot occur with the process of the invention. This is because no sodium salts (except for common salt) are added.

As a result of this firm texture, unblanched peas with sodium compound added are firm prior to sterilization and thus better withstand rough handling during processing steps (such as washing, fluming, and filling) as compared to blanched, conventional peas, with a high ionic concentration of Na compounds. This is because blanched tissue is more permeable to penetration by chemicals than fresh, unblanched tissue.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A process for canning green vegetables to produce a canned product substantially having the green color characteristic of the fresh green vegetable, said process being characterized by the absence of a blanching step and the absence of an addition of color retention additives, said process consisting of the steps of:

maintaining the vegetable from the time of harvest at a temperature below its thermal injury temperature and in a storage condition which allows air to flow about said vegetable to inhibit anaerobic respiration whereby the vegetable enters a subsequent sterilization step in a fresh, respiring state, substantially the same as when harvested;

sterilizing the vegetable at a temperature from about 250° F up the scorching temperature of the vegetable for a time sufficient to produce a commercially sterile vegetable; and sealing said vegetable in a container.

2. The process of claim 1 wherein the sterilization step is conducted at a temperature above 275° F.

3. The process of claim 1 wherein said sterilization step is effected by moving the vegetable against a heating medium to effect rapid heat exchange.

4. The process of claim 1 further characterized by the step of washing said vegetable in water at a temperature close to the temperature of thermal injury of said vegetable.

5. The process of claim 1 wherein said green vegetable is peas.

6. The process of claim 1 wherein said green vegetable is selected from the group consisting of spinach, asparagus, green beans, string beans, lima beans, brussle sprouts, kale, and mixtures thereof.

7. The process of claim 1 wherein said sterilizing step is effected with live steam.

* * * * *